United States Patent [19]

Groff et al.

[11] Patent Number: 5,237,972
[45] Date of Patent: Aug. 24, 1993

[54] TWO-STAGE CYCLE ENGINE AND COMBUSTION CHAMBER

[75] Inventors: Edward G. Groff, Troy; Keith Meintjes, Grosse Pointe Farms; Ramachandra Diwakar, Sterling Heights, all of Mich.

[73] Assignee: General Motors Corporation, Detroit, Mich.

[21] Appl. No.: 982,343

[22] Filed: Nov. 27, 1992

[51] Int. Cl.$^5$ ............... F02P 15/02; F02B 25/12; F02B 19/12; F02B 19/16
[52] U.S. Cl. ..................... 123/257; 123/661; 123/268; 123/285
[58] Field of Search ............... 123/65 R, 257, 661, 123/667, 285, 261, 268

[56] References Cited

U.S. PATENT DOCUMENTS

| | | | |
|---|---|---|---|
| 748,011 | 12/1903 | Remington | 123/257 |
| 2,893,360 | 7/1959 | Muller | 123/257 |
| 2,900,966 | 8/1959 | Brueder | 123/257 |
| 3,425,399 | 2/1969 | Ward et al. | 123/257 |
| 3,934,562 | 1/1976 | Isaka | 123/257 |
| 4,719,880 | 1/1988 | Schlunke et al. | 123/65 WA |
| 4,765,304 | 8/1988 | Brown | 123/532 |
| 4,774,919 | 10/1988 | Matsuo et al. | 123/257 |
| 4,807,572 | 2/1989 | Schlunke | 123/73 C |
| 4,821,687 | 4/1989 | Iwai | 123/65 P |
| 4,844,025 | 7/1989 | Sheaffer | 123/661 |
| 4,893,596 | 1/1990 | Nonaka | 123/193.6 |
| 4,899,698 | 2/1990 | Thery | 123/65 A |
| 4,945,864 | 8/1990 | Solomon et al. | |
| 4,969,329 | 11/1990 | Bolton et al. | |
| 5,058,548 | 10/1991 | Morikawa et al. | |
| 5,105,795 | 4/1992 | Ozawa et al. | |
| 5,163,396 | 11/1992 | Fukuda et al. | 123/661 |

Primary Examiner—Willis R. Wolfe
Assistant Examiner—M. Macy
Attorney, Agent, or Firm—Robert J. Outland

[57] ABSTRACT

A two-stroke cycle spark ignition engine having cylinder fuel injection is provided with a combustion chamber featuring a delta shaped bowl or cavity that is configured and positioned in the cylinder head to improve scavenging of the combustion chamber near the injector while maintaining adequate squish flow for improved charge mixing and combustion.

5 Claims, 3 Drawing Sheets

TWO-STAGE CYCLE ENGINE AND COMBUSTION CHAMBER

TECHNICAL FIELD

This invention relates to two stroke cycle internal combustion engines and to combustion chambers for such engines.

BACKGROUND

U. S. Pat. No. 4,719,880, issued Jan. 19, 1988, discloses a two stroke cycle engine having a cylinder with intake and exhaust ports controlled by reciprocation of a shallow domed piston. A cylinder head closing the cylinder has a concave face opposing the piston dome and a combustion chamber cavity of specific shape, offset toward the inlet port side of the cylinder.

U. S. Pat. No. 4,969,329, issued Nov. 13, 1990 to the assignee of the present invention, discloses a somewhat similar engine cylinder arrangement with an offset combustion chamber cavity. However, the head or top wall of the piston and the opposing end of the cylinder (except for the cavity) are flat.

SUMMARY OF THE INVENTION

The present invention provides an improved configuration of combustion chamber for engines of the sort disclosed in the above mentioned patents.

A feature of the invention in that the base of the cavity or combustion bowl has a modified delta shape which provides an enlarged outer side or periphery and entry area near the cylinder wall above the side inlet or boost port to cause a greater portion of the fresh charge to enter and scavenge the combustion bowl or cavity.

The cavity also has a shorter inner side and exit area overlapping but relatively near the central axis of the cylinder which provides enhanced squish area in the adjacent portions of the combustion chamber and piston end walls. Promotion of squish velocities and turbulence leading to improved fuel/air mixing and combustion are intended results.

A curved inwardly sloping outer wall joins with a smaller curved inner wall to form a bowl/cavity of relatively shallow depth (height as installed) as is permitted by the larger inlet area of the cavity. The shallow depth combined with avoidance of sharp curvature and a small initial inslope of the outer wall allow a smooth flow of the charge through the cavity for improved scavenging with reduced loss of momentum compared to deeper bowls. The improved scavenging, turbulence and fuel/air mixing which can result from application of the invention should improve combustion and enable a reduction in controlled exhaust emissions.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
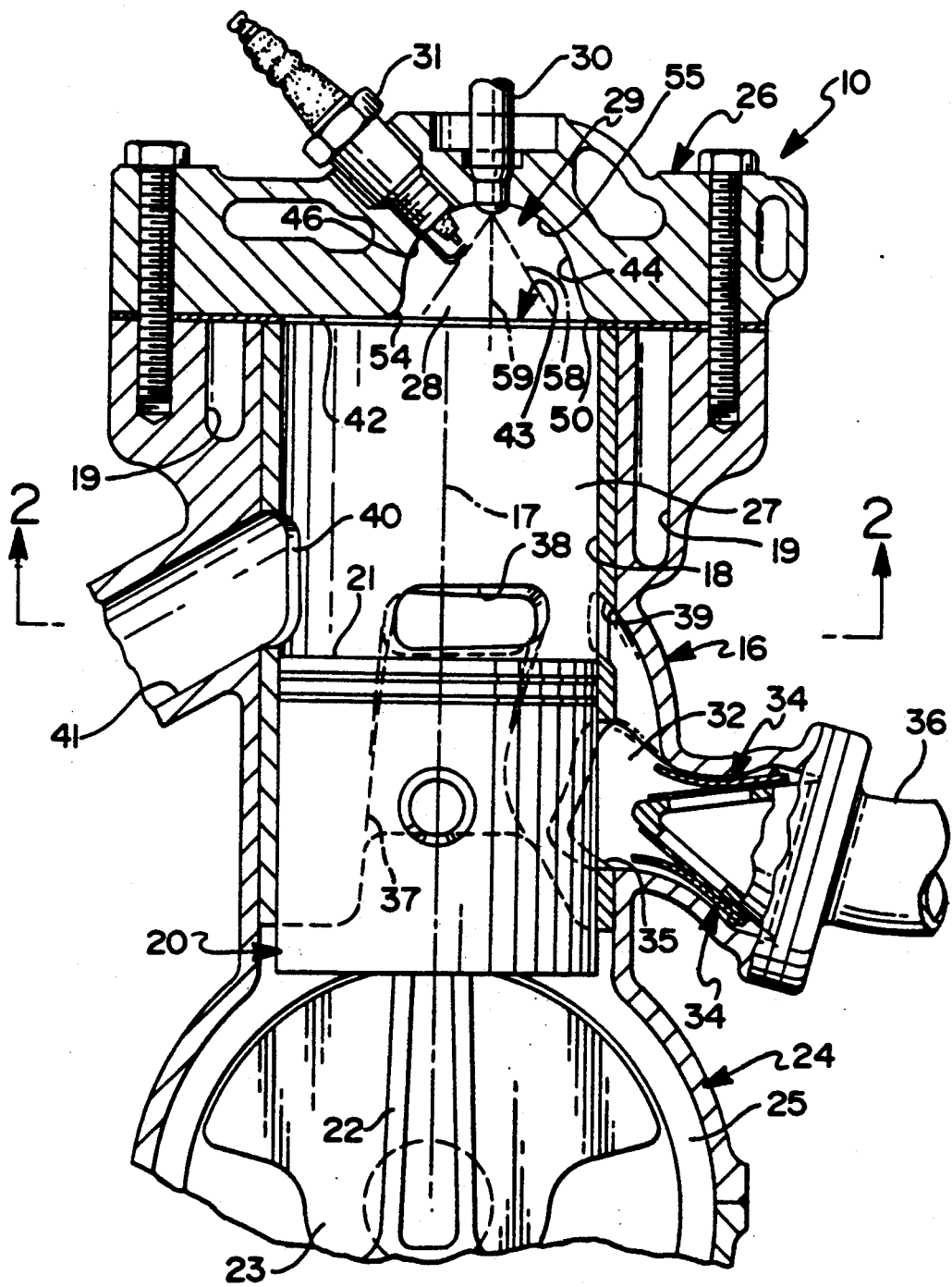
FIG. 1 is a transverse cross-sectional view of a two stroke cycle engine having a cylinder and combustion chamber cavity according to the invention.
Figure 2:
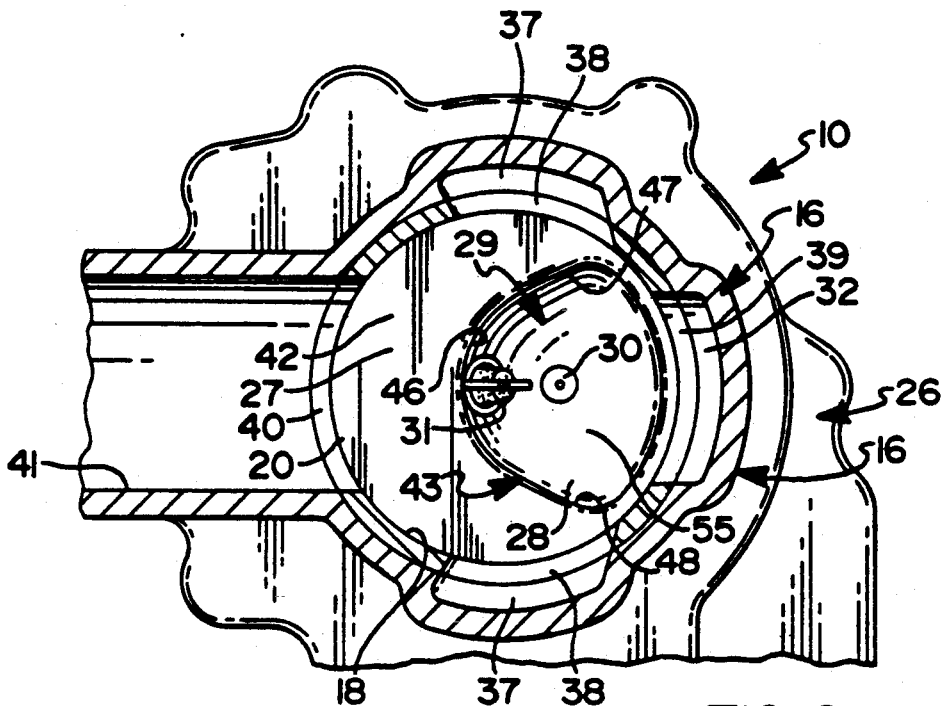
FIG. 2 is a cross-sectional view through the inlet and exhaust ports from the line 2—2 of FIG. 1 and showing their relation with the combustion chamber cavity.

Referring now to the drawings in detail, numeral 10 generally indicates a two stroke cycle internal combustion engine according to the invention. Engine 10 includes a cylinder block 16 having aligned on longitudinally spaced axes 17 a plurality of cylinders 18, only one of which is shown. The cylinders 18 may comprise cast iron or alloy liners inserted or cast into an aluminum block 16 which includes coolant passages 19 adjacent to the upper portions of the cylinder bore.

Pistons 20 having flat tops 21 are reciprocable within the cylinders 18 and are connected by connecting rods 22 to a crankshaft 23. The crankshaft is rotatably journaled within a crankcase 24 defined, at least in part, by the lower portion of the cylinder block 16 and separated longitudinally into individual crankcase chambers 25 located beneath each of the cylinders 18.

The upper ends of the cylinders 18 are closed at one end by a cylinder head 26 mounted on the cylinder block 16. The head 26 cooperates with the cylinders 18 and the flat tops 21 of the pistons to form working chambers 27 that include, at their upper ends, combustion chambers 28 primarily defined by recesses or cavities 29 in the cylinder head 26. A fuel injection nozzle 30 is fixed to the cylinder head at the location of each combustion chamber to deliver atomized fuel thereto. A spark plug 31 may also be provided to ignite air-fuel mixtures formed in the combustion chamber.

Fresh air charges are delivered to each crankcase chamber 25 during upward movements of its respective piston 20 through an associated intake passage 32 formed in the cylinder block. A reed valve assembly 34 in the intake passage prevents reverse flow. The downstream end of each intake passage 32 communicates with its respective crankcase chamber 25 through a piston controlled opening 35. The upstream end of each intake passage 32 connects with an inlet pipe 36.

A plurality of main scavenge or transfer passages 37 extend from each of the crankcase chambers 25 through the cylinder block 16 and scavenge ports 38 in the respective cylinder to discharge into its working chamber 27 when the piston approaches its bottom dead center position. The scavenge ports 38 are configured to direct the scavenging intake charges toward the inlet port side of the cylinder from which they are deflected in an upward direction toward the combustion chamber cavity 29.

One or more boost inlet ports 39 are also configured to assist in the direction of the intake charges toward the combustion chamber cavity 29 as previously described. The boost ports 39 connect the intake ports 32 and crankcase chamber 25 directly with the working chamber 27 when the piston is near bottom dead center.

An exhaust port 40 opens through the side of each cylinder opposite to the side where the scavenge charge is directed and the boost inlet ports 39 are located. The exhaust port 40 extends in the cylinder somewhat above the scavenging and boost ports 38, 39 in the direction of the combustion chamber 28 so that the exhaust port is opened first as the piston moves downward on its expansion stroke. The timing of the opening of the exhaust port can be varied, if desired, by using an exhaust port control valve located in or adjacent to an exhaust passage 41 as is well known in the art. Previously mentioned U. S. Pat. No. 4,969,329 shows one example of such an arrangement.

In operation of the engine portions so far described, which are broadly representative of prior art arrangements, air is drawn into each crankcase chamber 25 on the upstroke of its respective piston 20 while a previous air charge is being compressed and mixed with atomized fuel injected after the closing of the cylinder ports. Near top dead center, the air-fuel mixture is ignited by the spark plug 31, if provided, and burns as the piston begins its downstroke. Other means such as compression ignition could be used if desired.

As the burned gas expands, the piston uncovers first the top of the exhaust port 40, causing the cylinder pressure to drop as a hot blowdown pulse of burned gas is forced out of the cylinder through the exhaust passage 41. Shortly thereafter, the scavenging and boost ports 38, 39 are opened and the pressurized air charge in the associated crankcase chamber is forced into the cylinder. The charge is directed up into the combustion chamber cavity 29 and then down toward the exhaust port 40 in a looping path. Thus it forces most of the remaining burned gas and some of the scavenging air out of the cylinder through the exhaust port 40 while a fresh charge of air is left in the cylinder, ready for the next compression stroke.

In accordance with the invention, each combustion chamber 28 is partially defined by the cylinder head 26 which forms the closed end of each cylinder, each closed end including a generally flat squish portion 42 and a recess or bowl forming the combustion chamber cavity 29. The squish portion 42 closely confronts the piston flat top wall 21 at the extreme upward or top dead center position of the associated piston 20.

The cavity or recess 29 extends upward, as installed, from a modified delta shaped base 43 and includes an outer wall 44, an inner wall 46 and two side walls 47, 48. The outer wall 44 rises with an inward slope from an arcuate edge 50 of the base 43 adjacent and parallel with the portion of the cylinder above the inlet boost port 39. The side walls 47, 48 rise from opposite edges 51, 52 of the base 43, extending laterally and angularly inward from opposite ends of the arcuate edge 50 toward a point or location opposite the boost port 39 and near the exhaust port 40 side of the cylinder. The inner wall 46 rises from a curved edge 54 of the base 43 joining the angled edges 51, 52 on the exhaust port side of the cylinder and passing closer to the cylinder axis 17 than to the cylinder wall 18. The outer and inner walls 44, 46 curve upwardly inward and join with the side walls 47, 48 to form a dome 55 with a peak 56 located laterally between the cylinder axis 17 and the arcuate edge 50 of the cavity base 43.

Preferably, the outer wall 44 slopes upward and inward at an angle of between 15° and 25° from the cylinder wall. Also the curved edge 54 of the inner wall 46 is preferably positioned at less than one third of the radial distance from the cylinder axis 17 to the cylinder wall 18 and the inner wall 46 extends nearly parallel with the cylinder axis adjacent its edge 54 at the base of the cavity 29.

Fuel injection means are provided including an injection nozzle 30 for each cylinder. Each nozzle communicates with its respective combustion chamber cavity 29 at or near the peak 56 and preferably establishes a spray pattern 58 centered on a centerline 59 parallel with the cylinder axis 17. The axis of the injector may actually be slightly tilted in the view from the transverse plane 62 as seen in FIG. 1 to compensate for the bulk flows in the chamber 28 and ensure that the spray pattern is essentially directed along the centerline 59. As elements of the combustion cavity base 43, the curved edge 54 defining the inner wall 46 is preferably substantially centered on the injector spray centerline 59 while the arcuate edge 50 defining the outer wall 44 is substantially centered on the cylinder axis 17.

Figure 3:
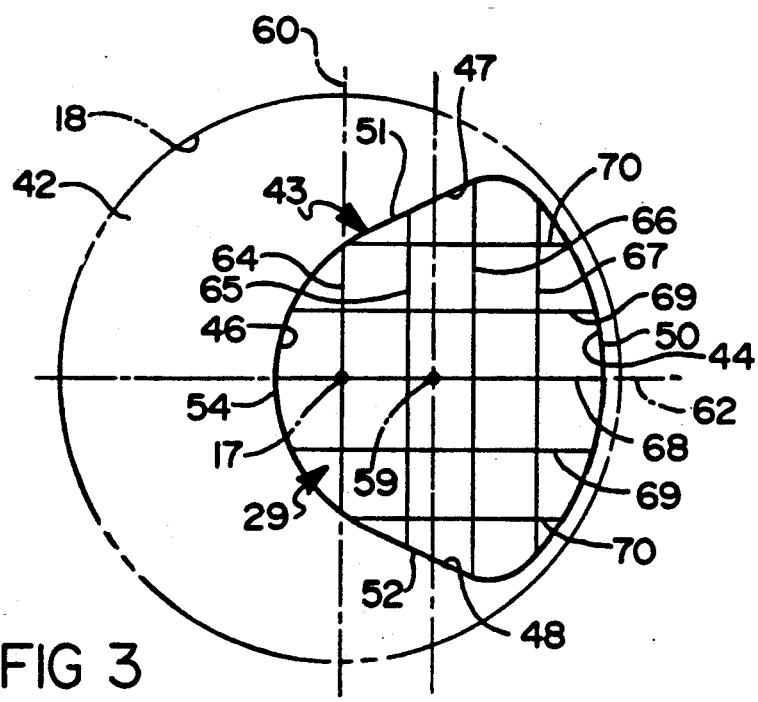
FIGS. 3-5 are schematic views illustrating a preferred shape of the combustion chamber cavity.
Figure 4:
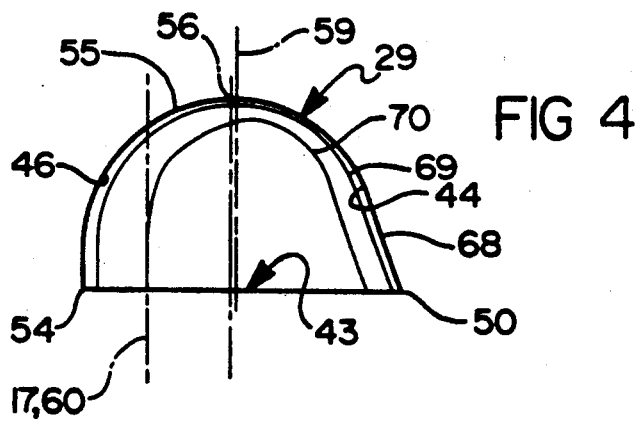
Figure 5:
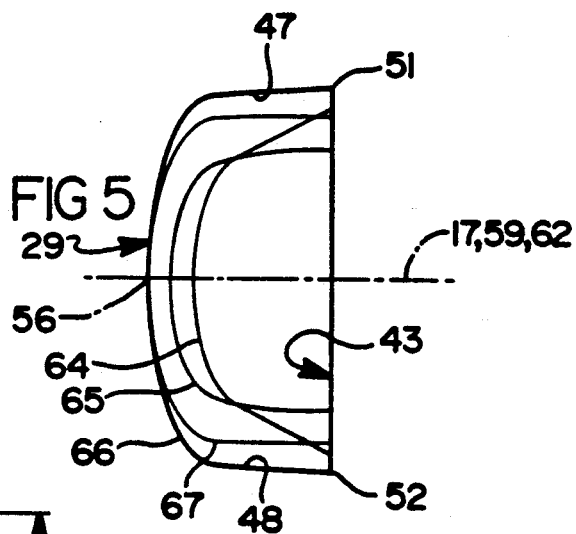

A preferred shape for the cavity 29 is shown in FIGS. 3–5. In the plan view of FIG. 3, numeral 60 represents a longitudinal plane through the axes 17 of the bank of cylinders in the engine and 62 represents the transverse plane 62 normal to plane 60 and intersecting the axis 17 of its respective cylinder to divide the cavity 29 into equal halves forming mirror images. Grid lines 64–70 as projected in FIGS. 4 and 5 represent the inner surface or wall contours of the cavity 29.

Figure 6:
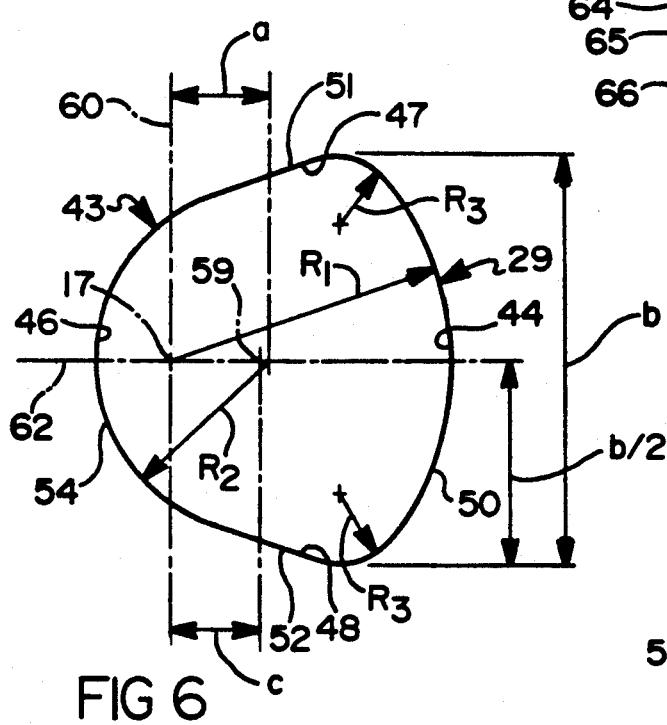
FIGS. 6 and 7 are outline views illustrating preferred dimensions of the combustion chamber cavity.
Figure 7:
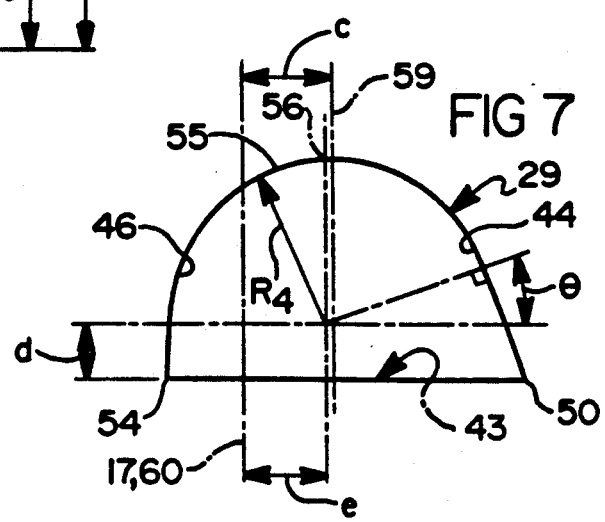

In a specific example for an engine of the type illustrated having an 86 mm cylinder bore and piston stroke, the dimensions shown in FIGS. 6 and 7 have the following values and probable ranges, it being understood that dimensions must be properly related to yield the desired cavity volume. A scaling factor is given in parentheses wherein S indicates scaling by the cube root of the cylinder displacement D in liters, i.e. $(D/0.5)^{\frac{1}{3}}$.

$R_1 = 40$ mm $\pm 2\%$ (Bore radius—3 mm)
$R_2 = 25$ mm $\pm 25\%$ (S)
$R_3 = 9.7$ mm approx (not critical)
$R_4 = 22.9$ mm $\pm 25\%$ (S)
$a = 15$ mm $\pm 25\%$ (S)
$b = 60$ mm $\pm 25\%$ (S)
$c = 14$ mm $\pm 25\%$ (S)
$d = 6.9$ mm $\pm 25\%$ (S)
$e = 12.9$ mm $\pm 25\%$ (S)
$\theta = 21° \pm 2°$ (not applicable)

The indicated ranges are approximate. For example the outer wall angle $\theta$ might range from 15°–25° in appropriate cases.

The description of one illustrated embodiment of the invention is in no way intended to be limiting of its possible applications. Numerous alternative features could be provided. For example, domed pistons could be used in place of the flat topped pistons shown. Also, the piston tops could include raised portions or cavities forming part of their associated combustion chambers. Further, the piston skirt may be arranged to control closing of the intake passage 32, in place of the reed valve assembly 34. Instead of the crankcase scavenging shown, external or blower scavenging might equally well be used.

While the invention has been described by reference to certain preferred and alternative embodiments, it should be understood that numerous additional changes could be made within the spirit and scope of the inventive concepts described. Accordingly it is intended that the invention not be limited to the disclosed embodiments, but that it have the full scope permitted by the language of the following claims.

What is claimed is:

1. A two stroke cycle internal combustion engine including a cylinder having an axis and closed at one end, a piston reciprocable in the cylinder and having a top wall movable into closely opposed relation with the cylinder closed end, and inlet and exhaust ports in the cylinder at substantially diametrically opposite locations and controlled by reciprocating motion of the piston, the cylinder closed end including a squish portion adapted to closely confront the piston top wall at its extreme upward position and a recess extending upward from a modified delta shaped base in the squish portion to form a combustion chamber cavity with an outer wall, an inner wall and two side walls, the outer wall rising with an inward slope from an arcuate edge of the base adjacent and parallel with the cylinder portion above the inlet port, the side walls rising from opposite angled edges of the base extending laterally and angularly inward from opposite ends of the arcuate edge toward a point near the exhaust port side of the cylinder, and the inner wall rising from a curved edge of the base joining the angled edges on the exhaust port side of the cylinder and passing closer to the cylinder axis than to the cylinder wall, the outer and inner walls curving upwardly inward and joining with the side walls to form a dome with a peak located laterally between the cylinder axis and the arcuate edge of the cavity base.

2. A two stroke cycle internal combustion engine as in claim 1 wherein the outer wall adjacent the arcuate edge slopes upward and inward at an angle of between 15° and 25° from the cylinder wall.

3. A two stroke cycle internal combustion engine as in claim 2 wherein the curved edge of the inner wall is positioned at less than one third of the radial distance from the cylinder axis to the cylinder wall and lies substantially parallel with the cylinder axis adjacent said base.

4. A two stroke cycle internal combustion engine as in claim 1 and further including fuel injection means opening to the cavity near said peak.

5. A two stroke cycle internal combustion engine as in claim 4 wherein the fuel injection means establishes a spray pattern centered on a centerline parallel with the axis, the arcuate edge of the base defining the outer wall being substantially centered on the cylinder axis and the curved edge of the base defining the inner wall being centered near the injector spray centerline.

* * * * *